Nov. 7, 1961 A. DRAVNIEKS 3,008,085
SOLIDS AND LIQUIDS CORROSION TESTING AND RECORDING
Filed Oct. 15, 1957 2 Sheets-Sheet 1
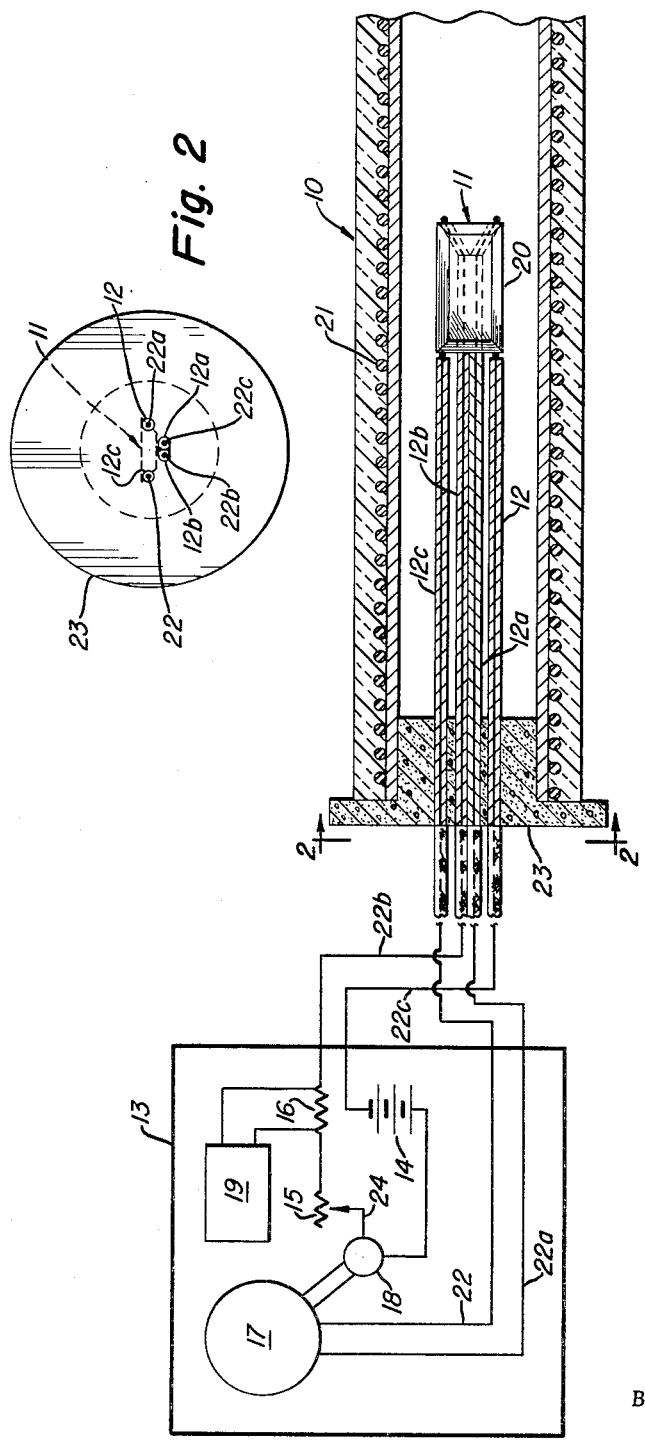
INVENTOR.
Andrew Dravnieks
BY Everett A. Johnson
ATTORNEY

United States Patent Office 3,008,085
Patented Nov. 7, 1961

3,008,085
SOLIDS AND LIQUIDS CORROSION TESTING AND RECORDING
Andrew Dravnieks, Park Forest, Ill., assignor to Standard Oil Company, Chicago, Ill., a corporation of Indiana
Filed Oct. 15, 1957, Ser. No. 690,310
10 Claims. (Cl. 324—71)

This invention relates to methods and apparatus for determining the corrosivity of solids and liquids.

Some fuel oil ashes, and slags in general, are corrosive when deposited on metal surfaces and the rate of corrosion due to such corrosive solids and ashes is of considerable industrial importance. Accordingly, test methods have heretofore been proposed but these have not been very satisfactory.

One such test, known as the crucible test, consists of measuring the rate of corrosion of a small sample of the metallic material in question which is inserted in a glazed porcelain crucible containing an ash and exposed for about 20 hours in a well ventilated air-atmosphere furnace. A weighed amount of ash is used in each crucible and the tests are run so that part of the specimen is submerged in the ash and part exposed to the furnace atmosphere. In such a system, the glaze on the crucible is frequently atacked by some of the corrosive solid or ash and it is probable that the reaction with the glaze has some effect on the test. Although the time of the high temperature testing is controlled at about 20 hours, the corrosion process, no doubt, continues for a longer period of time which is not readily controllable.

When the furnace test is completed, the specimens are broken out of the crucibles, the loose bulky part of the ash and corrosion products are removed. The specimens are then descaled in a molten salt bath and acid-dip process. The descaling is ordinarily difficult and not necessarily uniform. Further, it is necessary that several uncorroded specimens be put through the descaling treatment and that the weight loss of the uncorroded specimens be determined for comparison with the exposed specimen.

Substantial amounts of the ash are needed for such prior art crucible testing whereas frequently the amount available is quite small.

It is, therefore, a primary object of this invention to provide a corrosion test system which avoids the uncertainties and difficulties of the crucible test. A further object of the invention is to provide a system for making reliable corrosion determinations when only small amounts of the corrosive solids and liquids are available. An additional object of the invention is to provide a method and apparatus for obtaining a positive indication of corrosive conditions in the presence of the metals and under the operating conditions of the system being studied.

It is also an important object of this invention to provide a test system which yields a quantitative value in a short period of time. Another object of the invention is to provide a test element which may be easily and inexpensively prepared. A further object of the invention is to provide a method and apparatus which will automatically indicate the extent of corrosion by corrosive solids and liquids. Still another object of the invention is to provide an apparatus which electrically and automatically measures and records the extent of corrosion of a test specimen within an industrial installation and under conditions simulating such installation. These and other objects of the invention will become apparent as the description thereof proceeds.

Briefly, I attain the objects of my invention by providing a special form of corrosion specimen comprising a small container which may be made of the material which is to be tested for its corrosion resistance. The container or boat serves both to confine the corrosive substance and to provide the corrosion specimen. Electrical conductivity of the container is followed during the test, the extent of corrosion being indicated by a change in the electrical conductivity.

The advantages and details of the apparatus proposed will be described by reference to an embodiment thereof illustrated in the drawings wherein:

FIGURE 1 is a schematic showing of the corrosion test chamber and the electrical control-recording circuit;

FIGURE 2 is an end view of the test chamber included in FIGURE 1; and

Figure 3:
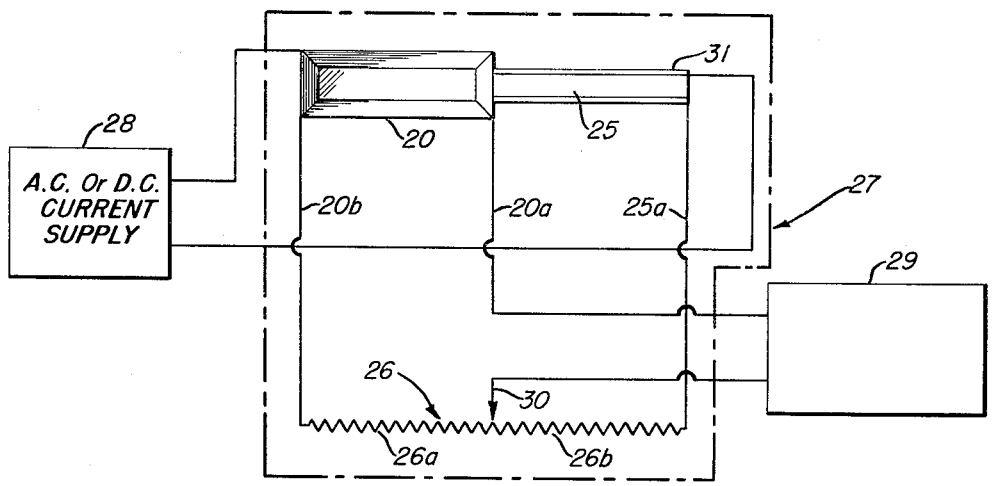
FIGURE 3 and 4 are diagrams illustrating other embodiments of my system employing a reference specimen.

My system includes the furnace 10, the boat-like specimen 11, the boat-supporting tubes 12, and the electrical control circuit 13. The circuit 13 includes the battery 14, variable resistance 15, constant resistor 16, the potential sensing means 17, and the servo-motor 18. A recording potentiometer 19 is connected across the constant resistor 16.

Corrosion specimen 11 comprises a boat-like pan 20 constructed by die-pressing a metal sheet. It is adapted to retain solid or liquid samples of corrosive substances to be tested, and micro-samples can be handled. The specimen 11 is placed within a furnace chamber 10 in which various atmospheres may be maintained and the temperature of which is controlled by the heater 21, and the conventional temperature-responsive switches or the like (not shown) may be provided.

The specimen 11 is supported centrally of the furnace 10 by means of the tubes 12 containing the four specimen-connecting leads 22, 22a, 22b, and 22c. The tubes 12 extend through the end closure or plug 23 whereby the assembly of tubes and specimen is supported as a cantilever.

Current from the battery 14 is passed through the specimen 11, the adjustable resistance 15, and the constant resistor 16 which are in series. A potential indicator-controller 17, e.g. a Brown Electronik Potentiometer, holds the potential drop over the corrosion specimen 11 constant by acting on the reversible electric motor 18 which moves the contact 24 of the variable resistance 15. A recording potentiometer 19 across the constant resistor 16 indicates the potential drop across the resistance 16. As the specimen 11 becomes thinner due to the corrosion, a smaller and smaller current is necessary to maintain the selected potential drop across the specimen 11. The potential drop across the constant resistor 16 is proportional to the current strength and is recorded by the recording potentiometer 19. The recorded value is a measure of the cross-section or mass of the specimen 11 containing the corrosive solids and liquids. The decrease in the cross-section is then for all practical purposes proportional to the amount of corrosion.

In making a test, according to my system, an ash sample of 100 to 200 mg. is placed in the boat-specimen 11 which is then placed in the electrically heated tube furnace 10. The test is conducted in 1 to 3 hours as compared to the earlier tests that required at least 20 hours. Furthermore, the progress of the corrosion and the effect of ambient atmospheres in accelerating or minimizing such corrosion can be sensed and recorded over the short period of exposure. Industrial installation conditions that may involve fast gas flow rates can be simulated within the tube furnace 10 and the undesirable side reactions which inherently influence the crucible test are entirely avoided.

Frequently, only small amounts of corrosive solids or liquids are available. The possibility of conducting micro-tests with such small amounts is particularly attractive, since, if a separate container were used, the danger of contamination of the small amount of sample by the container material is greater.

Figure 4:
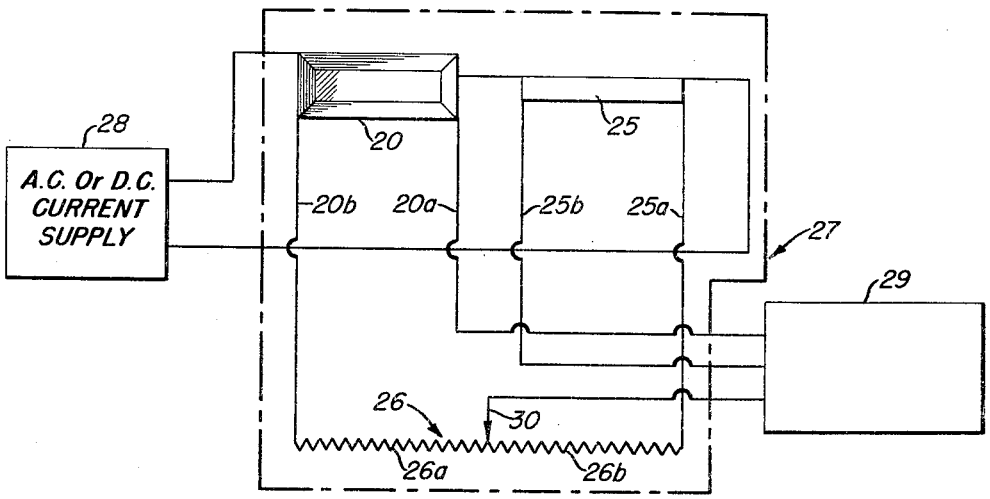

Other methods of using boat-like specimens 20 in connection with reference specimens 25 of the same metal are shown in FIGURES 3 and 4. The reference specimens 25 may be protected against corrosion either by a protective layer of ceramic material or by keeping the reference 25 out of contact with the corrosive substance in boat 20.

In FIGURE 3, boat-specimen 20 is one arm of the electrical bridge circuit 27; the protected reference specimen 25 is another arm of the bridge; and two adjustable arms 26a and 26b are formed by each of the ends of a calibrated slidewire 26. The bridge 27 is fed by an A.C. or D.C. supply 28, and the unbalance is detected by a Kelvin-type high-sensitivity electronic amplifier employing measuring circuit 29. As 20 corrodes, the movable contact 30 on 26 is moved to bring 29 into balance; and the position of contact 30 on 26 is a measure of corrosion of the specimen 20.

In FIGURE 3, the reference specimen 25 is an extension of the boat-specimen 20 but is provided with a protective coating 31 to prevent corrosion. In FIGURE 4, the reference specimen 25 is spaced apart from the boat-specimen 20 and does not corrode since it is not in contact with the solid or liquid which fills the boat-specimen 20. If the atmosphere is corrosive by itself, it may be advantageous to use a protective coating 31 also in this case.

Sometimes, it may be beneficial to coat with a protective coating also the outside of the boat 20, leaving only the inside of the boat 20 exposed to the corrosive substance. This might prevent corrosive effects from the atmosphere or from an occasional spillage of the boat contents. Also in case of molten ashes, molten liquid creeps all over, outside and inside, the boat 20. Thus, in such case, both surfaces of the specimen 20 corrode, and this must be taken in account when calculating corrosion rates.

From the above, it will be apparent that I have attained the objects of my invention and have provided a novel and useful system for testing the corrositivity of even small samples of solids or liquids and for evaluating materials of construction for use in the presence of such corrosive matter. Likewise, the efficiency of additives designed to combat such corrosion can be determined.

The invention has been described with respect to a preferred embodiment, however, it should be understood that this is by way of illustration only and that the invention is not necessarily limited thereto. Alternative embodiments and testing techniques will become apparent to those skilled in the art in view of the description of my invention and, accordingly, modifications in the method and means described are contemplated without departing from the spirit and scope of my invention.

What I claim is:

1. An apparatus for corrosion testing of liquid and solid masses comprising a test chamber, a corrosion specimen in the form a vessel disposed within said chamber, means for applying an initial current across said specimen, means for measuring an electrical characteristic of said specimen during the passage of said initial current, and means for subsequently measuring the said characteristic of the specimen maintained in said chamber while retaining a corrosive mass therein whereby change in said characteristic is a measure of the extent of corrosion during the retention of the corrosive mass in said specimen.

2. The apparatus of claim 1 wherein said vessel comprises a generally rectangular, box-like open-topped container, a first pair of electrical leads from one end of said vessel, and a second pair of electrical leads from the other end of said vessel.

3. The apparatus of claim 2 wherein said leads are rigid and said vessel is supported in said chamber by rigid tubular members containing said leads.

4. The apparatus of claim 2 which includes rigid tubular members carrying said leads and providing a cantilever beam support for said vessel.

5. The apparatus of claim 4 wherein said chamber comprises a furnace within which said vessel is supported by said tubular members through a wall thereof.

6. The specimen of claim 1 wherein a portion of the vessel is coated with a protective layer so that it does not corrode.

7. The specimen of claim 6 wherein the outside of the vessel is coated with the protective layer.

8. The specimen of claim 1 which includes in addition to said vessel a reference specimen.

9. The reference specimen of claim 8 which includes a corrosion-protective coating thereon.

10. The specimen of claim 1 which includes a separate reference specimen portion unexposed to the sample under test.

References Cited in the file of this patent

UNITED STATES PATENTS

| | | |
|---|---|---|
| 2,735,754 | Dravnieks | Feb. 21, 1956 |
| 2,824,283 | Ellison | Feb. 18, 1958 |
| 2,864,252 | Schaschl | Dec. 16, 1958 |
| 2,869,003 | Marsh et al. | Jan. 13, 1959 |
| 2,878,354 | Ellison | Mar. 17, 1959 |